United States Patent [19]

Weiss

[11] 4,197,574

[45] Apr. 8, 1980

[54] GUARD FOR A LIGHT EMITTING BULB

[76] Inventor: Hubert L. Weiss, 2880 Motor Ave., Los Angeles, Calif. 90064

[21] Appl. No.: 907,395

[22] Filed: May 18, 1978

[51] Int. Cl.[2] .............................................. B60Q 3/04

[52] U.S. Cl. .................................... 362/294; 362/378; 362/362; 362/390

[58] Field of Search ............... 362/376, 377, 378, 390, 362/362, 294

[56] References Cited

U.S. PATENT DOCUMENTS

| | | | |
|---|---|---|---|
| 3,609,348 | 9/1971 | Marasco et al. | 362/378 X |
| 3,767,913 | 10/1973 | Trevithick | 362/378 |

*Primary Examiner*—Stephen J. Lechert, Jr.

*Attorney, Agent, or Firm*—Lyon & Lyon

[57] ABSTRACT

A device for protecting a light emitting bulb such as an ordinary light bulb from impact and rain. The device includes a substantially cylindrical body which is closed at one end. A neck is formed through the closed end to accommodate a light socket and the body defines a cavity to enclose a light bulb positioned in the socket. Holes extend through the closed end of the body adjacent the cylindrical wall. The holes extend upwardly in tubes above the surface of the closed end. A circular flange extends inwardly from the closed end into the cavity. This flange is larger in diameter than the bulb to be placed within the cavity; and it extends to a knife edge. The outer extremity of each hole through the closed end is aligned with the inner surface of the substantially cylindrical wall while the inner extremity of each hole is aligned with the outer surface of the flange.

8 Claims, 2 Drawing Figures

GUARD FOR A LIGHT EMITTING BULB

BACKGROUND OF THE INVENTION

The field of the present invention is protective devices for light emitting bulbs. More specifically, the present invention is directed to an improved guard for a light emitting bulb.

Light sources of various types have long been a part of outdoor construction projects where work is performed at night. Quite often ordinary incandescent bulbs are employed as such a light source because of their portability and their simplicity, requiring only a power source, cable and sockets. However, incandescent bulbs suffer two significant drawbacks. First, they are very fragile. Second, they become quite hot when in use. Their fragile nature makes them quite vulnerable to the rough environment of construction projects and the like. The high temperature operation of these bulbs creates several problems. The heat can cause burns to the workers and fires. High thermal stresses are experienced when rain hits the hot bulbs causing them to shatter. Furthermore, protective devices placed about such incandescent bulbs have the problems of getting hot themselves and also trapping in the heat if not properly constructed.

To improve the utility of incandescent bulbs for rough outdoor environments such as construction projects, a wide variety of guards has become available. The guards which have been developed have generally attempted to provide four features, unimpeded light emission, high impact resistance, venting or heat dissipation, and rain protection. Of these features, venting and rain protection have been found to be somewhat conflicting in the design requirements necessary for meeting these goals. Large vents allow rain to get to the hot bulb while good rain protection reduces the venting capacity. Design of such devices with these goals in mind has been further complicated by the fact that rain is often accompanied by wind. The wind both drives the rain laterally into otherwise protected vent openings and can swing the guard and light bulb assembly from a vertical orientation. In both cases, the wind can act to promote rain water getting onto the light bulb contained within the guard, causing it to shatter.

SUMMARY OF THE INVENTION

The present invention is directed to a guard for an incandescent light bulb. The guard of the present invention is intended to provide maximum light transmission, impact resistance, heat venting and rain protection. The rain protection extends to conditions when wind is blowing the rain laterally against the guard and swinging the guard from a vertical position.

To accomplish a substantial venting capacity while maintaining excellent rain protection, vent holes are placed about the periphery of the closed top of the guard of the present invention. These vent holes extend upwardly forming tubes such that rain collecting on the upper surface of the guard will not sheet over the vent holes. This sheeting over of the vent holes could otherwise allow the water to be driven into the vent holes in substantial quantity under windy conditions.

A flange is also employed within the cavity of the guard itself to direct any rain which is driven into the vent holes away from the bulb. If the guard is vertically oriented, the intruding water simply drips vertically from the flange around the bulb, avoiding contact therewith. If the guard is tipped for any reason, the flange acts to collect the water and convey the water to the lowest point on the flange where the water may then drip onto the wall of the guard and run harmlessly out the bottom of the guard. A knife edge may be provided on the bottom extremity of the flange to promote the conduction of the water along the flange to the lowest point thereof without premature dripping of the water onto the bulb.

As a further feature of the present invention, the holes are aligned with both the flange and the wall of the guard to further promote water conduction away from the bulb contained within the guard. To this end, the outer extremity of the hole is aligned with the inner side of the guard wall such that water entering the vent hole will tend to run continuously through the vent hole and down the wall of the guard. The inner extremity of each vent hole is aligned with the flange so that water may run continuously from the vent hole down onto the flange and around to the lowermost point of the flange where it can then be harmlessly conducted from the guard. Thus, the employment of a continuous flange within the guard and appropriately placed vent holes has been found to provide excellent venting and excellent rain protection.

Accordingly, it is an object of the present invention to provide an improved guard for a light emitting bulb. Other and further objects and advantages will appear hereinafter.

DETAILED DESCRIPTION OF THE PREFERRED EMBODIMENT

Figure 1:
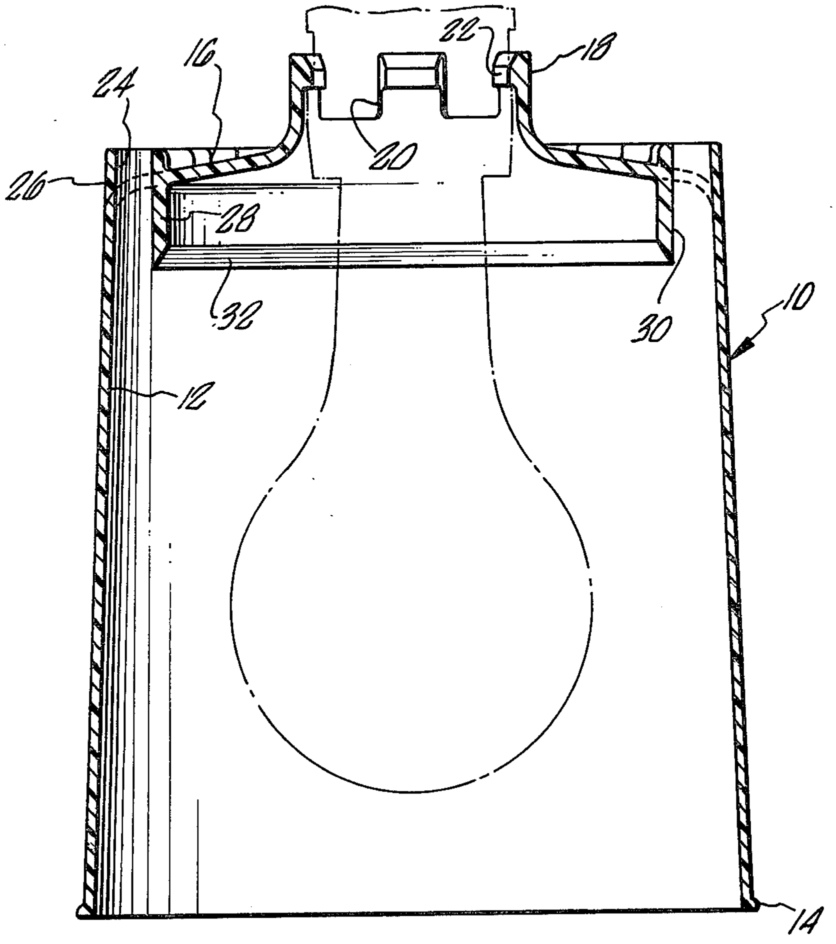
FIG. 1 is a cross sectional elevation of the guard for a light emitting bulb illustrating the socket and bulb in cross section.
Figure 2:
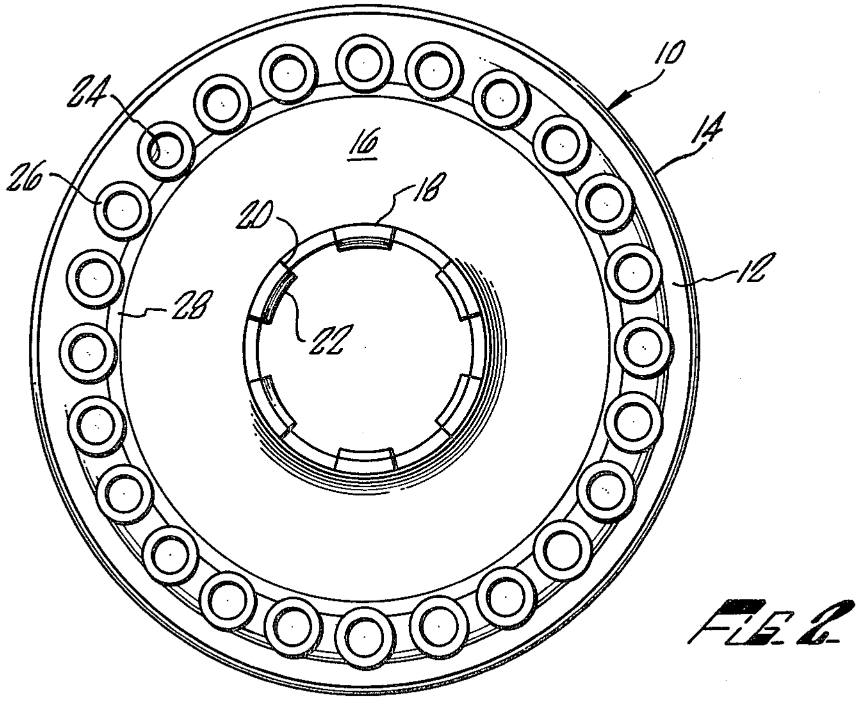
FIG. 2 is a top view of a guard for a light emitting bulb.

Turning in detail to the drawings, a guard for a light emitting bulb is illustrated as being of one-piece construction. The guard is illustrated as a hollow body, generally designated 10. This hollow body is preferably made of a high impact plastic material which is transparent or translucent, depending upon the intended use. Coatings to provide color or selected reflectivity may also be applied for particular uses.

The hollow body 10 includes a wall portion 12 which is generally cylindrical in shape with a slight draft for ease of manufacture. The cylindrical wall portion 12 defines a cavity of sufficient size to enclose a light emitting bulb within. Such a bulb can be seen in FIG. 1 in phantom. At the lower end of the wall portion 12 is an outwardly disposed flange 14 which may serve as a means for attaching a bottom cover. A bottom cover is not shown in the present embodiment; but such devices are well known to those skilled in the art.

At the upper end of the hollow body 10 is a top portion 16 which is joined, in the present embodiment as a single piece, with the upper end of the wall portion 12. This top portion 16 is slightly conoidal. The slight outward and downward slope of the top portion 16 promotes runoff of accumulated water such as rain water. At the same time, a minimum interior cavity above the vent holes in effected where heated air can accumulate.

At the center of the top portion 16 is a neck portion 18. Again, the neck portion 18 is of unitary construction with the top portion 16. The neck portion 18 extends upwardly from the top portion 16 to define a substantially cylindrical cavity for receipt of a socket such as shown in FIG. 1 in phantom. To accommodate the socket and to facilitate assembly, vertical notches 20 extend through the side wall of the neck portion 18. These notches 20 lend flexibility to the neck portion 18 by configuring the neck portion into individual fingers. Each of the fingers is slightly barbed at 22 to increase the purchase on a socket positioned therein.

In a circumferential ring about the top portion 16, there are located numerous vent holes 24. These vent holes 24 extend through the top portion to provide for the convection of air heated by the light bulb. Through the use of a large number of holes 24, adequate convection venting can be achieved. At the same time, smaller diameter holes can be employed to better control impinging rain water as will be more fully discussed below. In a preferred embodiment of the present invention, these holes have a nominal inside diameter of 0.32 cm. (⅛ inch).

The top portion 16 extends upwardly about each hole 24 to define a short tube 26. This short upward projection about each hole 24 prevents rain water accumulated on the broad area of the top portion 16 from flowing over or into any of the holes 24. An earlier practice with such guards has been to provide such guards with flush vent holes located on other than a horizontal surface. Under windy conditions, the rain water sheeting over such openings can be blown into the interior of the guard. It can be noted that in the present embodiment, the holes are spaced sufficiently to allow accumulated rain water to flow around the upstanding tubes 26 and harmlessly down the outer side of the hollow body 10.

A flange 28 extends inwardly from the top portion 16. The flange 28 is generally cylindrical in the preferred embodiment and a projection downwardly of the outer surface 30 of the flange defines a volume which is larger than any light bulb contemplated for use with this guard. The object of the flange 28 is to collect water which intrudes through the vent holes 24 and direct the water harmlessly away from the heated light bulb. By making the outer surface 30 of the flange 28 larger than any bulb contemplated for use in the guard, intruding rain water will flow or drip downwardly from the bottom edge of the flange without contacting the bulb when the guard is in a truly vertical position.

As set forth in the background, the contemplated use of such guards is in outdoor construction projects and other similar harsh environments where the guards do not remain vertical in their use. Wind during a storm may cause the guard and bulb assembly to swing from the vertical; and, equally likely, the guards will not be exactly vertical when positioned. Consequently, it cannot be assumed that intruding rain water will always drip or flow from the flange 28 in a cylindrical pattern which will miss the enclosed light bulb. To this end, the outer surface 30 of the flange 28 is substantially continuous in the sense that no sharp corners or large interstices are defined by the flange except at its lower edge and the outer surface is closed in that a complete path exists about the flange 28. The cylindrical configuration of the preferred embodiment provides such a continuous, closed outer surface 30 of the flange 28. The continuous, closed outer surface 30 provides a smooth path for the flow of intruding rain water about the flange 28 to its lowest point when the guard is not in a truly vertical position. Rain water entering from all of the vent holes 24 will run substantially downwardly on the flange 28 to the bottom edge thereof where it then collects and migrates to this lowermost point. Because of the tipping of the guard, the lowermost point of the flange 28 is vertically above the wall portion 12. The collected rain water is thus directed to the wall portion 12 where it can run harmlessly from the guard. As a further advantage in promoting the flow of intruding rain water to the lowermost portion of the flange 28, a knife edge is provided along the bottom edge of the flange 28 by beveled portion 32.

The orientation of the vent holes 24 and the flange 28 enhances the collection of intruding water on either the flange 28 or the wall portion 12. The vent holes 24 are preferably relatively small such that a large majority of the rain directed into any one of the holes 24 will come in contact and adhere to the wall of the hole. The elongated tube like nature of each hole 24 also promotes such contact by the intruding rain water. The vent holes 24 are specifically aligned at their outer extremity with the inside surface of the wall portion 12. The inner extremity of each vent hole 24 is aligned with the outer surface of the flange 28 such that water passing downwardly through the holes 24 will likely encounter a continuous surface extending from the hole 24 to the inner side of the wall portion 12 or the outer surface 30 of the flange 28. The natural attraction of the water to the surfaces prevents its flow toward the hot light bulb.

Thus, an improved light guard is disclosed which provides adequate venting of heat by convection through the vent holes 24 and at the same time provides a unique system by which water is prevented from traveling from these vent holes to a hot light bulb contained within the guard. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A guard for a light emitting bulb, comprising a hollow body including a wall portion defining a cavity capable of surrounding a light emitting bulb, a top portion joined with said wall portion to close a first end of said cavity, a neck portion extending to said cavity through said top portion for receipt of a socket for a light emitting bulb, and holes extending through said body near said first end, wherein the improvement comprises a flange extending inwardly from said top portion and having a continuous, closed outer surface inwardly of said holes and disposed such that a projection of said outer surface defines a volume in said cavity capable of receiving a light emitting bulb therein.

2. The device of claim 1 wherein the improvement further comprises said holes extending through said top portion adjacent said wall portion and said top portion extending outwardly to form a tube about each said hole.

3. The device of claim 2 wherein the improvement further comprises the inner extremity of each of said holes being aligned with said outer surface of said flange.

4. The device of any one of claims 2 and 3 wherein the improvement further comprises the outer extremity of each of said holes being aligned with the inner side of said wall portion.

5. The device of claim 1 wherein the improvement further comprises said flange extending to a knife edge.

6. The device of claim 4 wherein the improvement further comprises said holes with tubes being sufficiently spaced apart such that water which does strike the said top portion of the guard will flow in between the adjacent holes instead of over them and into the guard.

7. The device of claim 6 wherein the improvement further comprises said holes being of sufficient elongation so as to substantially eliminate the incidence of raindrops entering the guard directly via the said holes without first coming into contact with the side walls of the said holes.

8. The device of claim 7 wherein the improvement further comprises a substantially cylindrical inner flange which extends inwardly from said top portion of the guard and whose vertical downward projection at all points does not intercept the space defined and occupied by said light emitting bulb.

* * * * *